United States Patent
Striedelmeyer (10) Patent No.: US 12,328,053 B2
(45) Date of Patent: Jun. 10, 2025

(54) ELECTRIC MACHINE WITH ROTOR COOLING

(71) Applicant: Magna PT B.V. & Co. KG, Untergruppenbach (DE)

(72) Inventor: Thomas Striedelmeyer, Stuttgart (DE)

(73) Assignee: Magna PT B.V. & Co. KG, Untergruppenbach (DE)

(*) Notice: Subject to any disclaimer, the term of this patent is extended or adjusted under 35 U.S.C. 154(b) by 527 days.

(21) Appl. No.: 17/734,241

(22) Filed: May 2, 2022

(65) Prior Publication Data

US 2022/0360133 A1   Nov. 10, 2022

(30) Foreign Application Priority Data

May 7, 2021  (DE) .................. 10 2021 204 671.1

(51) Int. Cl.
| | |
|---|---|
| H02K 5/20 | (2006.01) |
| H02K 7/04 | (2006.01) |
| H02K 9/19 | (2006.01) |
| H02K 21/14 | (2006.01) |

(52) U.S. Cl.
CPC ............ *H02K 5/203* (2021.01); *H02K 7/04* (2013.01); *H02K 9/19* (2013.01); *H02K 21/14* (2013.01)

(58) Field of Classification Search
CPC ........... H02K 5/203; H02K 5/20; H02K 7/04; H02K 9/19; H02K 21/14; H02K 3/24; H02K 1/32; H02K 1/2706; H02K 1/274
See application file for complete search history.

(56) References Cited

U.S. PATENT DOCUMENTS

| | | | |
|---|---|---|---|
| 2018/0062463 A1* | 3/2018 | Ito | H02K 1/32 |
| 2020/0021155 A1 | 1/2020 | Miyazono | |

FOREIGN PATENT DOCUMENTS

| | | | |
|---|---|---|---|
| DE | 102010004711 A1 | 7/2011 | |
| DE | 102018111993 A1 * | 11/2019 | ............ H02K 1/32 |
| JP | 2009118686 A | 5/2009 | |
| JP | 2011254580 A | 12/2011 | |
| JP | 2018191363 A | 11/2018 | |
| JP | 2020136550 A | 8/2020 | |

(Continued)

OTHER PUBLICATIONS

English translation of JP-2018-191363-A (Year: 2018).*
English translation of WO-2022077349-A1 (Year: 2022).*
English translation of DE-102018111993-A1 (Year: 2019).*

*Primary Examiner* — Tulsidas C Patel
*Assistant Examiner* — Joshua Kiel M Rodriguez
(74) *Attorney, Agent, or Firm* — Dickinson Wright PLLC (57) ABSTRACT

An electric machine includes a stator and rotor. The rotor has rotor laminated core mounted on a shaft, and the shaft includes an oil channel. The rotor laminated core has channels parallel to the axis of the shaft and termination plates are disposed at the ends of the rotor laminated core. The oil channel has transverse bores that are arranged on the front side of the electric machine in planes distanced axially from one another. A balancing plate at an end of the rotor laminated core includes a peripheral wall having apertures that communicate with the channels of the rotor laminated core, such that oil impacting the peripheral wall passes into the channels. Stator winding heads and the rotor laminated core can be cooled simultaneously via two cooling paths the axially offset transverse bores.

20 Claims, 5 Drawing Sheets

(56) References Cited

FOREIGN PATENT DOCUMENTS

| WO | 2019049397 A1 | 3/2019 |
| WO | 2020217075 A1 | 10/2020 |
| WO | WO-2022077349 A1 * | 4/2022 |

* cited by examiner

ELECTRIC MACHINE WITH ROTOR COOLING

CROSS-REFERENCE TO RELATED APPLICATIONS

This application claims priority to DE 102021204671.1 filed May 7, 2021. The entire disclosure of the above application is incorporated herein by reference.

FIELD

The invention relates to an electric machine with a stator and rotor, wherein the rotor has a rotor laminated core mounted on a shaft, wherein the shaft comprises an oil channel, and the rotor laminated core have channels parallel to the axis of the shaft and termination plates at the ends, wherein the oil channel has transverse openings.

BACKGROUND

This section provides information related to the present disclosure which is not necessarily prior art.

Permanent magnets with rare earth elements are used in electric machines. If the permanent magnet becomes too hot, there is the risk of demagnetisation, whereby the electric machine may sustain irreparable damage. In hybrid vehicles therefore, the cooling of the electric machine is an essential factor, regardless of the specific installation situation.

Particularly problematic is the heat management in 2.5 hybrid systems. One example of such a transmission can be found in DE 10 2010 004 711 C5. Due to the specific connection, the electric machine experiences higher speeds during travel at high vehicle speed, and these higher speeds could very plausibly last for minutes.

Due to the high losses that occur in the electric machine, temperatures thus lie in the range in which they are already critical for the magnets. Therefore, heat must be removed actively from the rotor laminations and the regions close to the magnets in order to be able to operate the electrical system for longer without limitation.

Document JP 2011 254 580 A describes an electric machine with a stator and rotor. A coolant flow path is provided along the rotor axis, wherein the coolant exits the rotor shaft via openings and flows in end plates to longitudinal channels in the rotor laminations.

Document JP 2009-118 686 A includes an electric machine with a stator and rotor, wherein the rotor has a rotor laminated core mounted on a shaft, wherein the shaft comprises an oil channel, and wherein the rotor laminated core has channels parallel to the axis of the shaft and termination plates at the ends of the rotor laminated core, wherein the oil channel has transverse bores which are arranged on the front side of the electric machine in planes distanced axially from one another and supply a first and a second cooling oil path.

The cooling path arranged in the second plane runs via the oil channel in the rotor shaft and a distributor port and via a switching unit which is pretensioned by a spring. If the spring holds the distributor port open, coolant can flow into the channels of the rotor laminated core. However, the oil flow of the two cooling paths is not parallel or always simultaneous. Rather, the two cooling paths are controlled so that either one or the other cooling oil path is active.

Document WO 2019/049 397 A1 describes a cooling system with a cooling channel which has a single feed via a connection opening. The coolant is not extracted via a rotor shaft, but is made available specifically for the rotor channels using a pump. No oil is sprayed as a result of centrifugal force from a bore onto a shoulder.

Document JP 2019-30 051 A likewise provides a deflection of an incoming coolant, which is delivered by a pump. Here, the coolant flows against a pocket-like structure so that a rotor channel is supplied with coolant.

In JP 2018-191 363 A too, only cooling for the rotor is provided, wherein the rotor channels are supplied directly with coolant via a pump. For distribution, a side plate of the rotor is used and has grooves and openings.

SUMMARY

This section provides a general summary of the disclosure, and is not a comprehensive disclosure of its full scope or all of its features.

The object of the present disclosure is to create an electric machine with a cooling system that allows efficient cooling of the rotor while simultaneously maintaining the stator cooling.

The object is achieved with an electric machine with a stator and rotor, wherein the rotor has a rotor laminated core mounted on a shaft, wherein the shaft comprises an oil channel, and the rotor laminated core have channels parallel to the axis of the shaft and termination plates at the ends, wherein the oil channel has transverse openings which are arranged on the front side of the electric machine in planes distanced axially from one another.

Due to the arrangement of the transverse openings, axially offset oil jets are created, which are flung away from the shaft.

In order to cool both the stator and the rotor, a first plane is provided within the thickness of a termination plate of the rotor laminated core, the termination designed as a balancing disc on the front side of the electric machine, and a second plane is provided outside the balancing disc in the region of winding heads of the stator.

The oil jets flung away in axially offset fashion run past the balancing disc and, additionally, pass directly into an internal structure of the balancing disc.

This results in a first cooling oil path, which extends along the oil channel and exits through the transverse bores of the front side and the rear side of the electric machine, and the exiting cooling oil is flung onto the winding heads of the stator.

A second cooling oil path is guided via the oil channel, through the transverse bores on the front side, and along the balancing disc into the channels of the rotor laminated core.

The balancing disc is designed such that the balancing disc has at least one peripheral shoulder, in which apertures or pockets to the channels in the rotor laminated core are provided along the periphery of the shoulder.

The shoulder has a depth in the region of up to half the thickness of the balancing disc.

Alternatively, a plurality of shoulders can also be provided, radially distanced from one another with staggered depths.

A balancing disc with a plurality of shoulders would be suitable to guide channels with different radial distances corresponding to the shoulders through the rotor laminated core and thus optimally dissipate heat in the vicinity of the permanent magnets.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure, in which.

DETAILED DESCRIPTION

Figure 1:
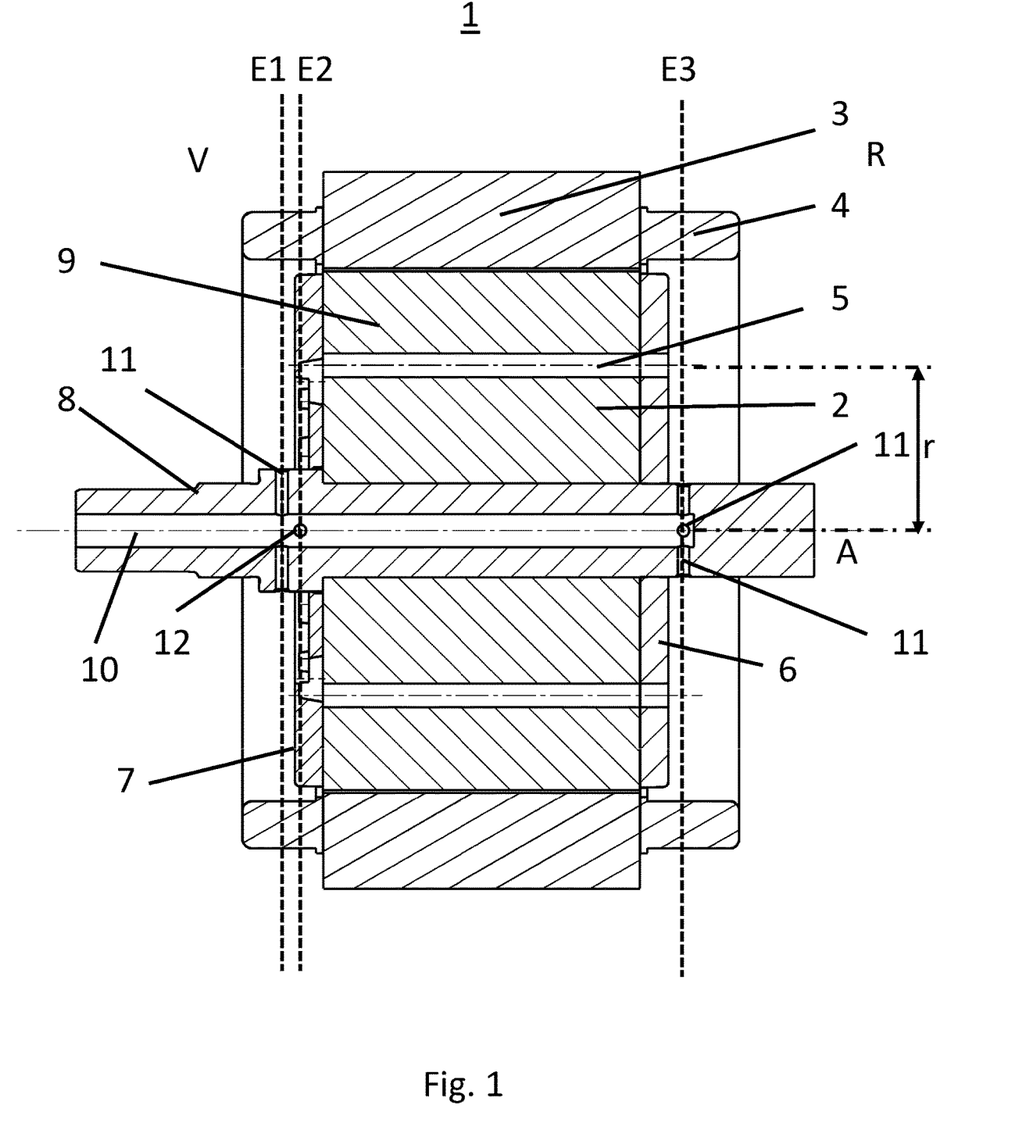
FIG. 1 is a cross-section of an electric machine.
Figure 2:
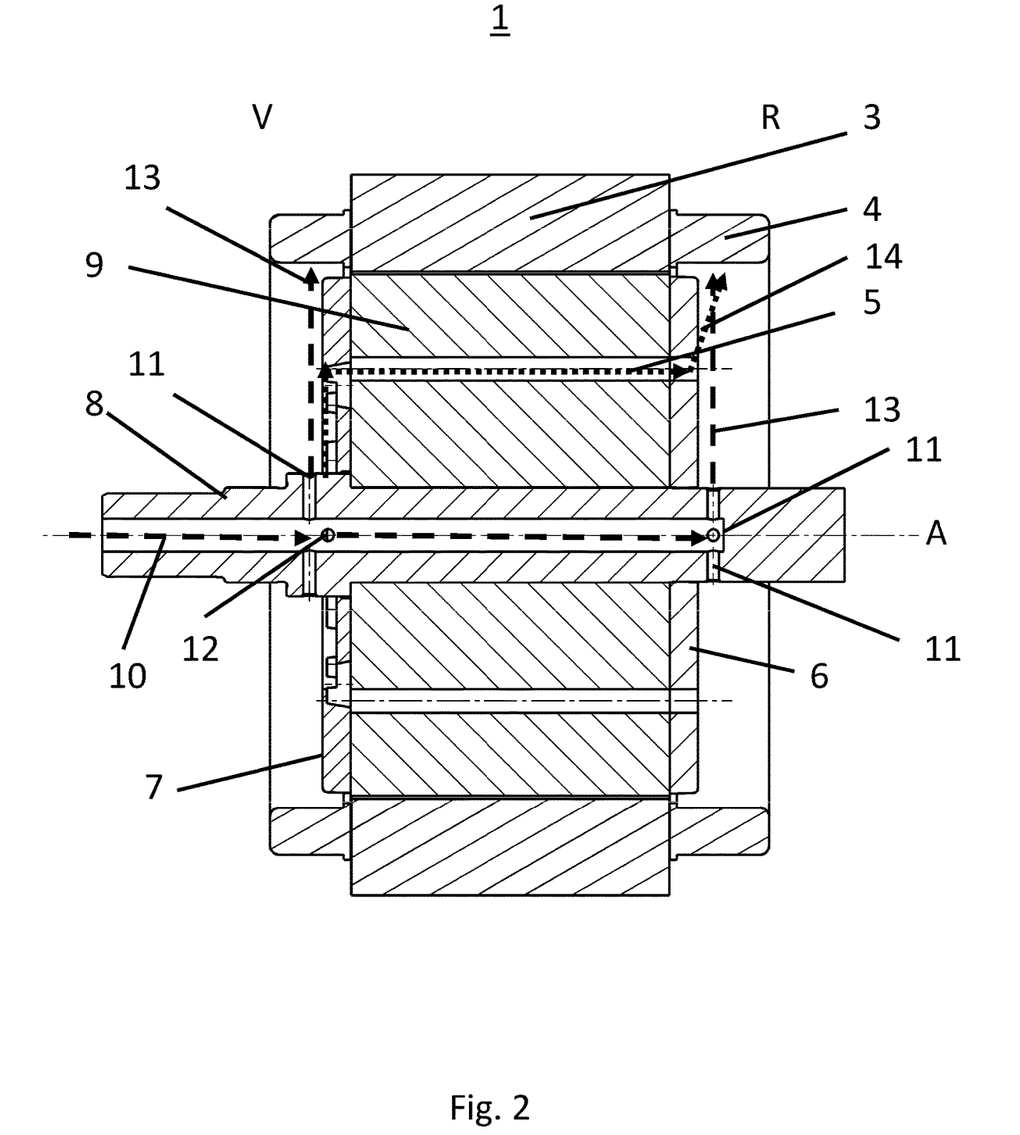
FIG. 2 is a cross-section similar to FIG. 1 with an oil guide illustrated thereon.

In FIGS. 1 and 2 an electric machine 1 is shown in longitudinal section. The electric machine includes two main components: a rotor 2 and a stator 3. The stator 3 has winding heads 4 on both sides.

The rotor 2 is in the form of a rotor laminated core 9, which is mounted on a shaft 8. The shaft 8 is guided on the front side V of the electric machine 1 from a housing (not shown). Channels 5 are arranged within the rotor laminated core 9 and extend along the axis A. The number of channels 5 may be selected according to the cooling issues of the intended use.

In one aspect, the channels 5 extend, for example, along a radius r at a uniform radial distance from one another, or may be distributed along the periphery at different radii r.

The rotor laminated core 9 is provided both on the front side V and on the rear side R with a termination plate which covers the rotor laminated core 9. The termination plate on the front side V is formed as a balancing disc 7 with a structure, and on the rear side R an unstructured termination plate 6 is provided.

A cooling channel 10 is provided in the shaft 8 of the rotor 2 and extends from the front side V to the rear side R.

The shaft 8, in a first plane E1, has transverse bores 11, and, in a second plane E2 distanced axially from the first plane E1, has transverse bores 12. Transverse bores 11 are also provided in a single plane E3 on the rear side R of the electric machine 1.

In the plane E1, the oil from the channel 10 is sprayed out by the centrifugal force of the rotor 2 from the channel 10 via the transverse bores 11 and through an open space onto the winding heads 4 of the stator 3. In the plane E2, the oil is sprayed out from the channel 10 and via transverse bores 12 onto the structure formed on the balancing disc 7, and is guided via the structure into the channels 5 of the rotor laminated core 9.

In FIG. 2 the oil flow described above is shown via arrows. The winding heads 4 are cooled via the transverse bores 11, both on the front side V of the electric machine and also on the rear side R. The cooling oil is flung out from the channel 10 via the bores 11 and contacts the winding heads 4 via cooling oil path 13. Because the transport of the oil is dependent on the rotational speed of the shaft 8, and on the oil quantity made available, the cooling of the winding head 4 on the rear side R of the electric machine is sometimes weaker because no more oil arrives.

Due to the newly introduced cooling oil path 14, however, the winding heads 4 on the rear side R of the electric machine 1 are also sufficiently cooled. The cooling oil path 14 extends initially radially starting from the transverse bore 12 of the shaft 8, contacts the structure of the balancing disc 7 described in greater detail hereinafter, is deflected, and is guided along the channels 5 of the rotor laminated core 9. This portion of the cooling coil exits the channels 5 on the rear side R of the electric machine 1 and is flung in the direction of the winding head 4 on the rear side R of the electric machine 1.

The permanent magnets (not shown in FIGS. 1 and 2) are embedded in the rotor laminated core 9 and are located spatially in the vicinity of, or adjacent, the channels 5. The heat of the permanent magnets is dissipated by the cooling oil passing through the channels 5.

Figure 3:
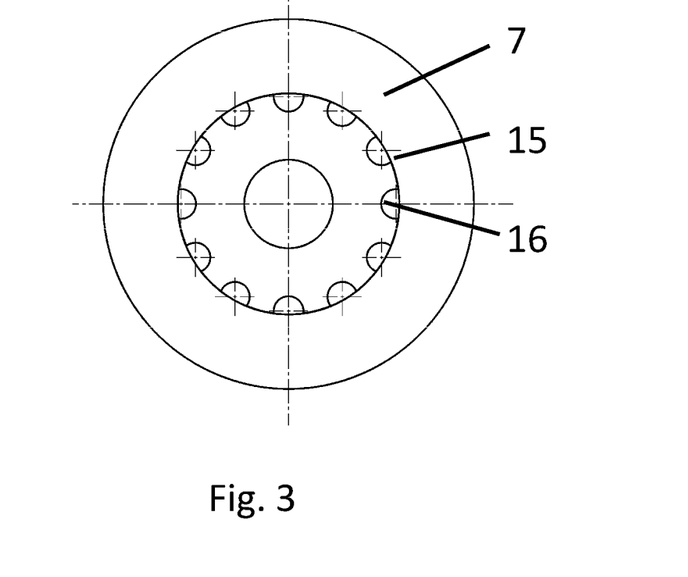
FIG. 3 is a plan view of the front side of the electric machine.
Figure 4:
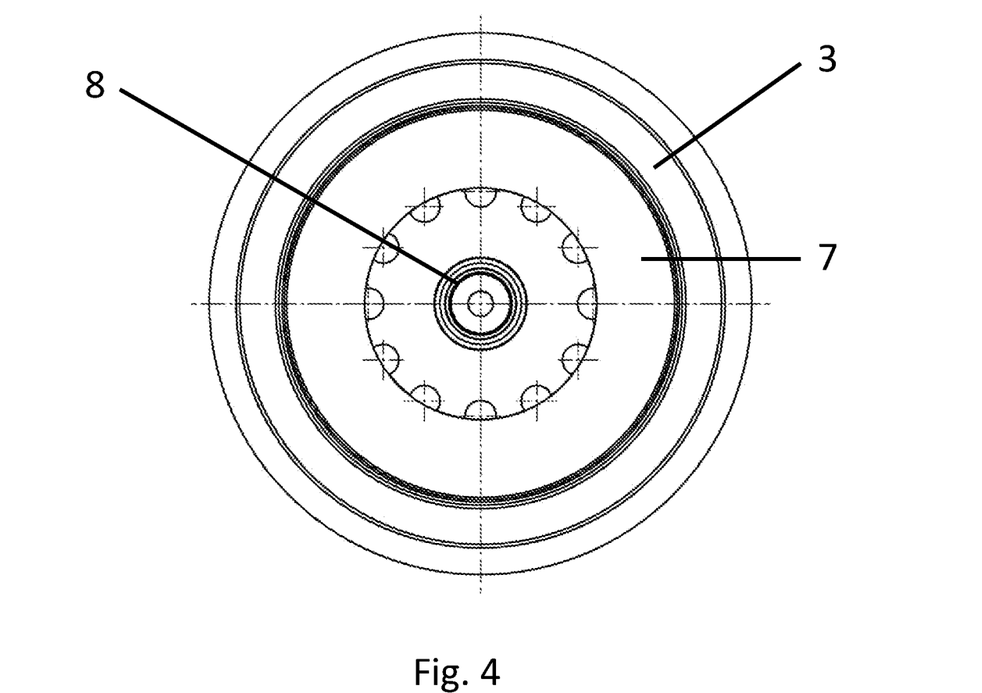
FIG. 4 is another plan view of the front side of the electric machine.

FIGS. 3 and 4 show a view of the front side V of the electric machine 1. A section through the balancing disc 7 shown in FIG. 3 can be seen in FIG. 5.

Figure 5:
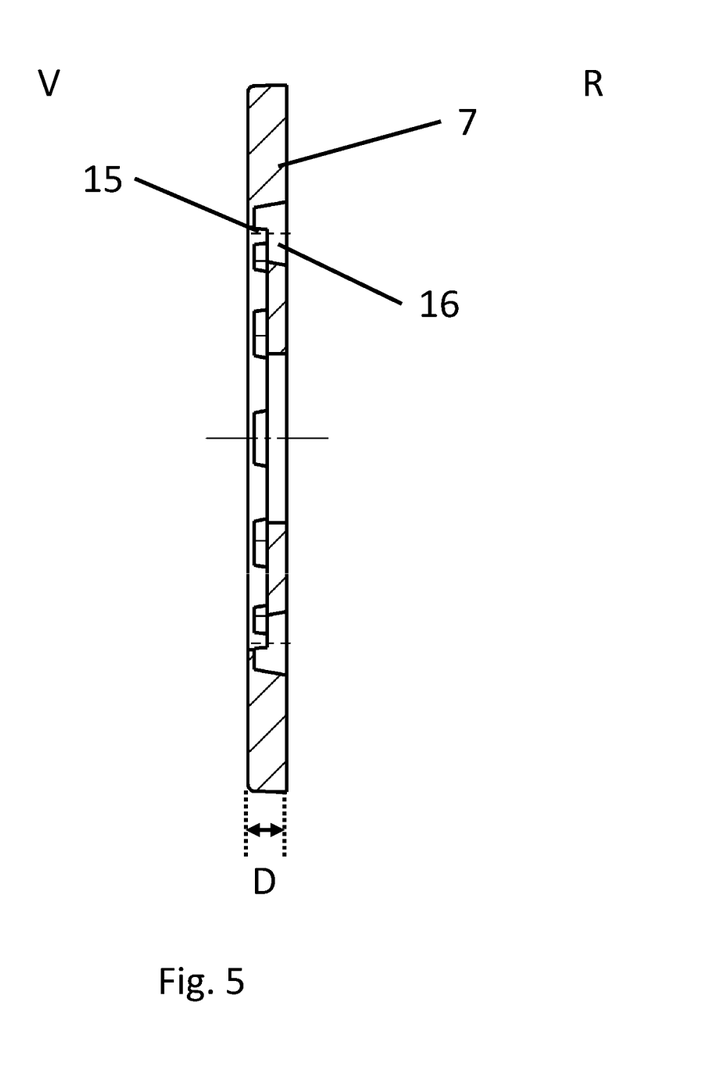
FIG. 5 is a longitudinal section through a rotor balancing disc.

The balancing disc 7 in the exemplary embodiment has a shoulder 15, in which the thickness D of the balancing disc is practically halved. An edge is thus formed, having approximately half the thickness of the balancing disc 7. The depth of the shoulder 15 is adapted to the specific embodiment of the balancing disc and the cooling channels 5.

The balancing disc 7 additionally has axial cut-outs in the form of apertures or pockets 16, through which the oil impacting against the shoulder 15 passes and is conducted axially to the rotor 2 and through the channels 5.

For optimized cooling of the electric machine 1, part of the oil quantity is spray out via the openings 12 and captured by the balancing disc 7 and conducted axially through the rotor 2. The rest of the oil is sprayed via transverse openings 11 onto the winding heads 4 and cools the stator 3.

Figure 6:
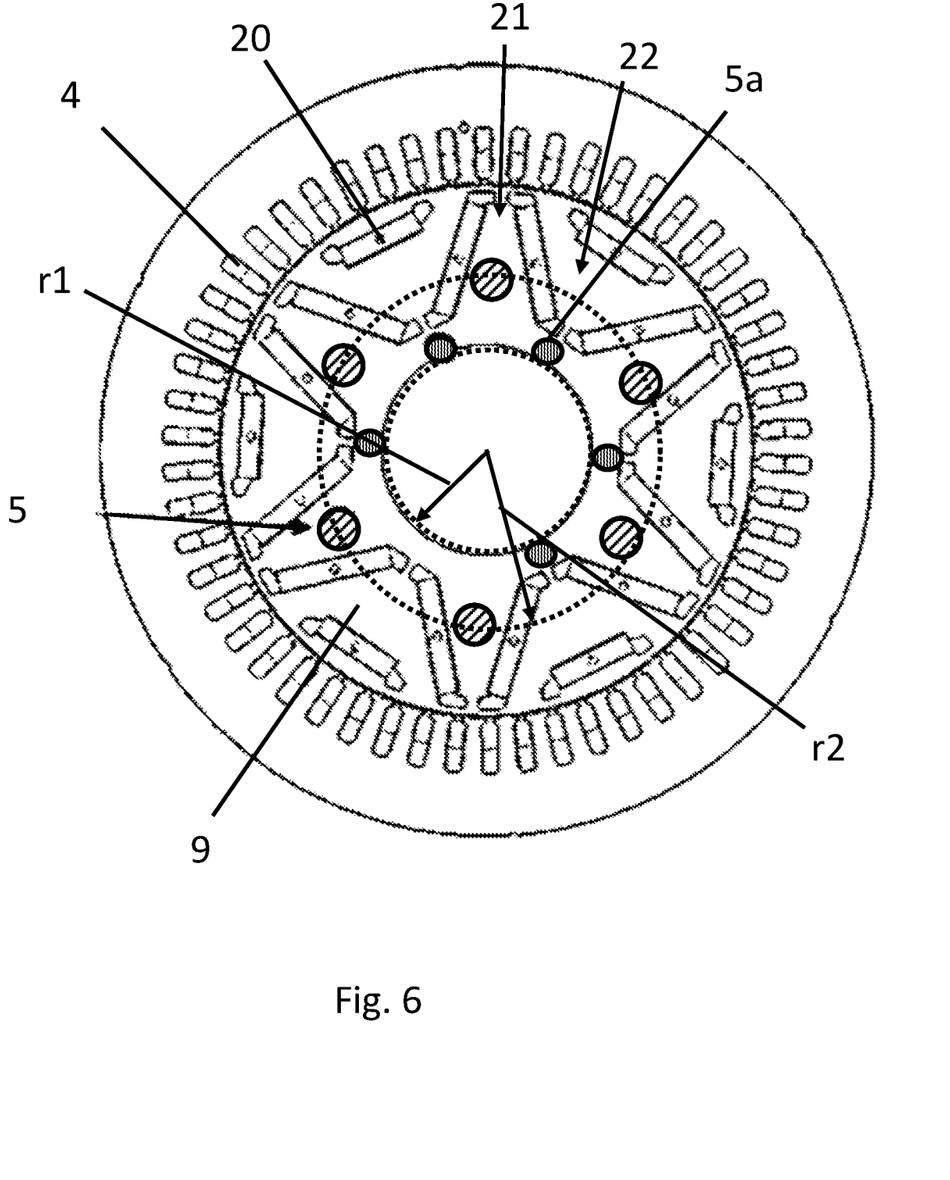
FIG. 6 is a plan view of a rotor laminated core within the stator.

FIG. 6 shows an alternative solution which is not limited to a specific channel type.

FIG. 6 shows winding heads 4 which are arranged around the rotor laminated core 9. Permanent magnets 20 are incorporated in a typical arrangement within the rotor laminated core 9. A set of permanent magnets 20 lies along the outer periphery of the rotor laminated core 9; further permanent magnets 20 are arranged as a V-shape, tapering inwardly and outwardly in alternation. Installation areas 21 and 22 are thus provided in the triangular spaces between pairs of permanent magnets 20.

Channels 5 are formed in the installation area 21 in a manner distributed over a periphery of radius r2. In addition, channels 5a are provided along a periphery with radius r1 and in this example have a smaller inner diameter than the channels 5.

A further advantageous arrangement uses channels which are arranged in the installation area 22 adjacent to three permanent magnets 20.

So that all channels 5, 5a can be supplied with oil, the balancing disc may be adapted accordingly by further shoulders 15 and apertures or pockets 16 along the peripheries of the radii r1 and r2, etc. The further shoulders 15 may be arranged at the different radii and may have staggered depths.

What is claimed is:

1. An electric machine with a stator and rotor,
   wherein the rotor includes a rotor laminated core mounted on a shaft,
   wherein the shaft includes an oil channel, and wherein the rotor laminated core include channels parallel to the axis of the shaft and termination plates disposed at opposite ends of the rotor laminated core, wherein the oil channel includes transverse bores that are arranged on a front side of the electric machine, the transverse bores arranged in planes distanced axially from one another, and the transverse bores supply a first and a second cooling oil path, and wherein a first plane of the planes runs within a thickness of a balancing disc, wherein the balancing disc is one of the termination plates, and a second plane of the planes runs outside the balancing disc and is disposed in the region of winding heads of the stator, wherein the second cooling oil path is guided via the oil channel and the transverse bores, wherein oil is sprayed from the channel and the transverse bores, and oil is guided onto a front side of the balancing disc into the channels of the rotor laminated core, wherein the balancing disc has an inner surface that faces the rotor laminated core and an outer surface that faces away from the rotor laminated core, wherein the balancing disc has at least one peripheral shoulder, wherein the at least one peripheral shoulder is defined by a recess formed in the outer surface of the balancing disc, wherein apertures to the channels in the rotor laminated core are provided in the shoulder along the periphery of the shoulder and conduct the oil impacting against the shoulder axially to the rotor.

2. The electric machine according to claim 1, wherein a first cooling oil path extends along the oil channel and through the transverse openings of the front side and the rear side of the electric machine, and oil exiting the first cooling path is flung onto winding heads.

3. The electric machine according to claim 1, wherein the shoulder has a depth up to half of the thickness of the balancing disc.

4. The electric machine according to claim 1, wherein a plurality of shoulders are provided on the balancing disc, wherein the shoulders of the plurality of shoulders are radially distanced from one another and have staggered depths.

5. The electric machine according to claim 4, wherein the channels of the rotor laminated core include channels at different radial locations, the different radial locations corresponding to the plurality of shoulders, and the channels lead through the rotor laminated core.

6. The electric machine according to claim 1, wherein the first and second cooling paths are operable to cool the rotor laminated core and the stator winding heads simultaneously.

7. The electric machine according to claim 1, wherein the second cooling path is operable to cool both the rotor laminated core and a portion of the stator winding heads, the portion of the stator winding heads disposed on the rear side of the rotor laminated core.

8. An electric machine comprising:
a stator including stator winding heads;
a rotor including a rotor laminated core mounted on a shaft, wherein the shaft includes an internal oil channel extending along a central axis of the shaft;
a balancing disc disposed at a first end of the rotor laminated core;
a plurality of channels extending through the rotor laminated core;
a first set of transverse bores extending radially through the shaft and in communication with the internal oil channel, the first set of transverse bores disposed at a first axial location axially offset from the balancing disc and axially aligned with the stator winding heads;
a second set of transverse bores extending radially through the shaft and in communication with the internal oil channel, the second set of transverse bores disposed at a second axial location that axially overlaps the balancing disc;
at least one peripheral shoulder defined by the balancing disc;
a plurality of apertures formed in the at least one peripheral shoulder and in communication with the plurality of channels that extend through the rotor laminated core;
a first cooling path extending through the oil channel, the first set of transverse bores, and radially through an open space toward the stator winding heads; and
a second cooling path extending through the oil channel, the second set of transverse bores, along the balancing disc, through the apertures, and into and through the channels of the rotor laminated core,
wherein the second cooling path flows from the second set of transverse bores, along an outwardly facing surface of the balancing disc that faces away from the rotor laminated core, and then through apertures and into the channels.

9. The electric machine according to claim 8 further comprising a third set of transverse bores extending radially through the shaft and in communication with the internal oil channel, the second set of transverse bores disposed at a third axial location offset from a second end of the rotor laminated core opposite the first end, wherein the first cooling path further extends through the third set of transverse bores.

10. The electric machine according to claim 8, wherein the first and second cooling paths are operable to cool the rotor laminated core and the stator winding heads simultaneously via the first and second sets of axially offset transverse bores.

11. The electric machine according to claim 8, wherein the stator winding heads include front side stator winding heads axially aligned with the first set of transverse bores and rear side stator winding heads disposed at an opposite end of the stator relative to the front side.

12. The electric machine according to claim 11, wherein the first cooling path includes a third set of transverse bores extending through the shaft and in communication with the oil channel, the third set of transverse bores axially aligned with the rear side stator windings.

13. The electric machine according to claim 11, wherein the second cooling path is operable to cool the rear side stator windings via oil exiting the plurality of channels of the rotor laminated core.

14. The electric machine according to claim 8, wherein the balancing disc is a front side termination plate, and a rear side termination plate is attached to the rotor laminated core on an end opposite the balancing disc.

15. The electric machine according to claim 14, wherein the balancing disc includes a structure defining the shoulder, and the rear side termination plate does not include a structure.

16. The electric machine according to claim 8, wherein the plurality of channels includes a first set of channels disposed at a first radius and a second set of channels disposed at a second radius.

17. The electric machine according to claim 16, wherein the at least one shoulder includes a first shoulder and second shoulder, wherein the first shoulder radially corresponds to the first set of channels and the second shoulder radially corresponds to the second set of channels.

18. The electric machine according to claim 16, wherein the first set of channels are disposed radially inward relative to the second set of channels and the first set of channels each have a smaller diameter than the second set of channels.

19. The electric machine according to claim 16, wherein the first set of channels is disposed radially inward and adjacent to permanent magnets embedded in the rotor laminated core.

20. The electric machine according to claim 19, wherein the second set of channels is disposed circumferentially between and radially aligned with the permanent magnets.

* * * * *